3,095,459
      PRODUCTION OF ETHYLENE DIBROMIDE
Ozjasz Schachter and Abraham Baniel, both of Haifa,
  Israel, assignors to Makhtsavei Israel, Haifa, Israel
      No Drawing. Filed Apr. 17, 1962, Ser. No. 188,260
       Claims priority, application Israel Apr. 28, 1961
                  1 Claim. (Cl. 260—660)

The present invention concerns the preparation of ethylene dibromide (EDB).

The conventional method for the preparation of EDB consists in bubbling ethylene into elementary bromine. This method has a number of disadvantages, especially the following:

(a) It is necessary to produce and isolate elementary bromine;
(b) Special equipment resistant to attack by bromine has to be used;
(c) As a result of the large excess of bromine present during most of the reaction, the desired addition of bromine to the double bond of the ethylene is accompanied by a number of different substitution reactions so that the reaction product is as a rule non-uniform and special purification procedures are required for the isolation of the EDB;
(d) The reaction is exothermic which makes cooling necessary.

It is known that the bromine which is formed by the chlorination of bromide brines can be extracted from the reaction mixture with EDB and it is also known that the extract can be used as a starting material for the production of further quantities of EDB. According to that known process ethylene is introduced into the EDB bromine solution and reacts with the bromine to form EDB. While in this process the reaction between ethylene and bromine proceeds quite smoothly, it has the drawback that during the extraction of the aqueous brine with EDB a certain quantity of the solvent remains dissolved or emulsified in the brine and has to be recovered by special measures which render the process inconvenient and expensive.

It is the object of the present invention to provide an improved process for the production of EDB starting from bromide brines.

The invention consists in a process for the production of EDB wherein a bromide brine containing not less than 0.5 g./l. of bromide is chlorinated, the chlorinated brine is extracted with tetrabromoethane (TBE), the TBE extract is separated from the brine, ethylene is introduced into the extract and the EDB thereby formed is separated from the TBE by distillation.

The use of TBE as extractant in accordance with the invention has the great advantage that practically no TBE is retained by the brine so that no additional separating steps are required.

Though in the process according to the present invention the EDB produced has to be separated by distillation from the TBE used as extractant whereas in the known process aforesaid in which EDB serves as the extractant no such separation is required, the former is still more convenient and cheaper than the latter. This is to be attributed both to the above-mentioned fact that no TBE is retained by the aqueous brine and to the great difference between the volatilities of EDB and TBE which render their separation by distillation very easy.

The concentration of the bromine in the TBE extract is low. The temperature rise due to the heat evolved by the exothermic reaction of the bromine with ethylene is correspondingly small and only slight cooling, if any, is required. For the same reason the corrosion problems are much less severe and the equipment may be made of material which cannot be used in the case of pure elementary bromine, e.g. polyethylene or lead.

The yields obtained in the process according to the invention are 95% or more calculated or bromine recovery.

The invention is illustrated by the following examples to which it is not limited:

*Example 1*

Brine from the Dead Sea (Israel) containing 10 g. of bromide ion per litre was reacted with 4.8 g. of chlorine gas per litre brine to liberate elementary bromine, as known per se. The resulting solution of bromine in brine was then extracted with tetrabromoethane (TBE) by contacting the brine with the extractant in a volume ratio of brine:TBE=10:1. The extraction was carried out in countercurrent in a conventional mixer-settler apparatus consisting of four units which provided about three theoretical stages. (The term "theoretical stage" denotes "one where contact between phases is sufficiently intimate and maintained for a sufficient period of time that distribution equilibrium is established, so that raffinate and extract are equilibrium solutions"—see R. E. Treybal, Liquid Extraction, McGraw-Hill, 1951.) The working volume of the mixers was 400 ml. and the settlers 800 ml. The volume of the brine treated was 45–50 l. per hour, providing for holding times of the order of 30 seconds in each mixer and 60 sec. in each of the settlers. The extract leaving the apparatus contained about 98 g. bromine/l., while the amount of bromine left in the extracted brine had decreased to 0.1–0.2 g./l.

The extracted brine leaving the fourth settler was introduced into an additional settling vessel of 30 l. volume which was made of mild steel lined with polyethylene and which provided for about 30 minutes' holding time. Any TBE entrained with the brine thus settled to the bottom and was withdrawn from time to time by opening a stopcock provided for the purpose.

The bromine contained in the extract was converted into ethylene dibromide by introducing the extract continuously into a stirred vessel which was again made of mild steel lined with polyethylene of one litre working capacity. Both the bromine solution and ethylene gas were introduced from the bottom in a ratio of about 15–16 l. gas/l. extract (measured at 20° C. and ordinary pressure). The solution leaving the reaction vessel contained less than one gramme bromine per litre and was slightly acid. It was washed with dilute soda solution and subjected to vacuum distillation. In view of the large difference in boiling points there is no difficulty in obtaining the ethylene dibromide completely free of TBE.

The yield in EDB was about 95% calculated on both bromine and ethylene. There were only nominal losses of TBE.

*Example 2*

The procedure according to Example 1 was modified in that during the bromine extraction stage the ratio of brine to TBE was: 20:1 (v./v.) and the extraction equipment was designed to provide four theoretical extraction stages. Under these conditions the bromine concentration in the TBE extract was about 196 g./l. while the extracted aqueous brine contained 0.1 to 0.2 g./l. of residual bromine.

The EDB solution was reacted with ethylene as described in Example 1 and the yield of EDB was 95% of the theory calculated on both ethylene and bromine.

*Example 3*

Residual brine resulting from salt production from sea water and containing 2.1 g./l. of bromine ion was chlorinated with 11 litres of chlorine per litre of brine and extracted with TBE in a ratio of brine:EDB=20:1 (v./v.)

in one theoretical contact. The resulting TBE extract contained about 40 g./l. of bromine and was treated with about 6-8 litres of ethylene per litre extract as described in Example 1. Yield 95% of the theory calculated on both the ethylene and bromine.

We claim:

A process for the production of ethylene dibromide wherein a bromide brine containing not less than 0.5 g./l. of bromide is chlorinated, the chlorinated brine is extracted with tetrabromoethane, the tetrabromoethane extract is separated from the brine, ethylene is introduced into the extract and the ethylene dibromide thereby formed is separated from the tetrabromoethane by distillation.

References Cited in the file of this patent

UNITED STATES PATENTS 2,746,999    Gunkler et al. _____ May 22, 1956
2,921,967    Yaron _____ Jan. 19, 1960

OTHER REFERENCES

Marshall et al.: Analyst, 83, 687–8 (1958).